(12) United States Patent
Johnson et al.

(10) Patent No.: US 7,369,968 B2
(45) Date of Patent: May 6, 2008

(54) ENTERPRISE ENERGY MANAGEMENT SYSTEM

(75) Inventors: Daniel T. Johnson, Medina, MN (US); Robert S. McConnell, Woodbury, MN (US)

(73) Assignee: Verisae, Inc., Minneapolis, MN (US)

(*) Notice: Subject to any disclaimer, the term of this patent is extended or adjusted under 35 U.S.C. 154(b) by 0 days.

(21) Appl. No.: 11/423,860

(22) Filed: Jun. 13, 2006

(65) Prior Publication Data

US 2007/0010914 A1 Jan. 11, 2007

Related U.S. Application Data

(63) Continuation-in-part of application No. 10/768,957, filed on Jan. 30, 2004, now Pat. No. 7,062,389, and a continuation-in-part of application No. 09/883,779, filed on Jun. 18, 2001, and a continuation-in-part of application No. 10/429,619, filed on May 5, 2003, and a continuation-in-part of application No. 10/734,725, filed on Dec. 12, 2003, and a continuation-in-part of application No. 10/771,090, filed on Feb. 3, 2004, and a continuation-in-part of application No. 10/922,364, filed on Aug. 20, 2004, and a continuation-in-part of application No. 11/431,147, filed on May 9, 2006.

(60) Provisional application No. 60/496,432, filed on Aug. 20, 2003, provisional application No. 60/444,437, filed on Feb. 3, 2003, provisional application No. 60/444,091, filed on Jan. 31, 2003, provisional application No. 60/433,179, filed on Dec. 13, 2002, provisional application No. 60/432,120, filed on Dec. 9, 2002, provisional application No. 60/288,827, filed on May 5, 2001, provisional application No. 60/212,234, filed on Jun. 16, 2000.

(51) Int. Cl.
 *G06F 15/00* (2006.01)
(52) U.S. Cl. ..................... 702/188; 705/412
(58) Field of Classification Search ............... 702/188, 702/66, 182–185, 61–65, 33.38, 69, 73; 705/412
See application file for complete search history.

(56) References Cited

U.S. PATENT DOCUMENTS 4,612,620 A 9/1986 Davis et al.

(Continued)

FOREIGN PATENT DOCUMENTS

EP 1566875 8/2005

(Continued)

OTHER PUBLICATIONS

The Chemical Manufacturer's Association & The Environmental Protection Agency, "Compliance Guidance For Industrial Process Refrigeration Leak Repair Regulations Under Section 608 of the Clean Air Act", Oct. 1995, XP002280116, http://www.epa.gov/ozone/ttile6/608/compguid/guidance.pdf.

(Continued)

*Primary Examiner*—Edward Raymond
(74) *Attorney, Agent, or Firm*—Faegre & Benson LLP

(57) ABSTRACT

A system for managing energy consumption by equipment located at a site or a plurality of sites. The system includes a database including information relating to pieces of energy consuming equipment located at a site. A server is programmed to process utility bills and/or analyze data to predict trends in energy consumption.

27 Claims, 7 Drawing Sheets

U.S. PATENT DOCUMENTS

| | | | |
|---|---|---|---|
| 4,688,026 A | 8/1987 | Scribner et al. | |
| 4,755,957 A | 7/1988 | White et al. | |
| 4,989,141 A | 1/1991 | Lyons et al. | |
| 5,079,930 A | 1/1992 | Beaverson et al. | |
| 5,198,774 A | 3/1993 | Williams, II et al. | |
| 5,231,841 A | 8/1993 | McClelland et al. | |
| 5,434,775 A | 7/1995 | Sims et al. | |
| 5,537,313 A | 7/1996 | Pirelli | |
| 5,572,438 A * | 11/1996 | Ehlers et al. | 700/295 |
| 5,732,401 A | 3/1998 | Conway | |
| 5,748,956 A | 5/1998 | Lafer et al. | |
| 5,752,244 A | 5/1998 | Rose et al. | |
| 5,758,126 A | 5/1998 | Daniels | |
| 5,821,937 A | 10/1998 | Tonielli | |
| 5,831,610 A | 11/1998 | Tonielli et al. | |
| 5,845,265 A | 12/1998 | Woolston | |
| 5,859,778 A | 1/1999 | Kuroda et al. | |
| 5,860,286 A | 1/1999 | Tulpule | |
| 5,910,776 A | 6/1999 | Black | |
| 5,918,207 A | 6/1999 | McGovern et al. | |
| 5,923,850 A | 7/1999 | Barroux | |
| 5,946,662 A | 8/1999 | Ettl et al. | |
| 5,956,658 A | 9/1999 | McMahon | |
| 5,980,090 A | 11/1999 | Royal, Jr. | |
| 5,987,903 A | 11/1999 | Bathla | |
| 5,996,889 A | 12/1999 | Fuchs et al. | |
| 6,128,602 A | 10/2000 | Northington et al. | |
| 6,154,738 A | 11/2000 | Call | |
| 6,169,979 B1 | 1/2001 | Johnson | |
| 6,293,114 B1 | 9/2001 | Kamemoto | |
| 6,298,333 B1 | 10/2001 | Manzi et al. | |
| 6,385,510 B1 | 5/2002 | Hoog et al. | |
| 6,430,542 B1 | 8/2002 | Moran | |
| 6,650,346 B1 | 11/2003 | Jaeger et al. | |
| 7,062,446 B1 | 6/2006 | Suhy, Jr. et al. | |
| 2001/0047383 A1 | 11/2001 | Dutta | |
| 2002/0059364 A1 | 5/2002 | Coulthard et al. | |
| 2002/0138361 A1 | 9/2002 | Sy-Yuan | |
| 2003/0154141 A1 | 8/2003 | Capazarlo et al. | |
| 2004/0024662 A1 | 2/2004 | Gray et al. | |
| 2004/0162642 A1 | 8/2004 | Gasper et al. | |
| 2006/0170889 A1 | 8/2006 | Honda | |
| 2006/0256308 A1 | 11/2006 | Honda | |

FOREIGN PATENT DOCUMENTS

| | | |
|---|---|---|
| JP | 10340846 | 12/1998 |
| JP | 2004-301825 | 10/2004 |
| WO | WO 99/66436 A1 | 12/1999 |
| WO | 0017984 | 3/2000 |
| WO | WO 01/97146 A | 12/2001 |
| WO | 0207365 | 1/2002 |
| WO | WO 02/090914 A | 11/2002 |
| WO | 2005048328 | 5/2005 |
| WO | 2005062351 | 7/2005 |

OTHER PUBLICATIONS

Dilger, Karen Abramic, Asset management, maintenance redefined, Manufacturing Systems, v15n7,pp. 122-128, Jul. 1997, CODEN:MASYES<ISSN: 0748-948x, jrnl code: mfs, Dialog file 15. Accession No. 01493159.

Pays, P. et al., An intermediation and payment system technology, Computer Networks and ISDN Systems, North Holland Publishing, Amsterdam, NL, vol. 28, No. 11, May 1996, pp. 1197-1206, ISSN: 0169-7552.

Johnson, Robert, "Developing an EPA refrigerant regulations compliance program", Chemalliance, Mar. 29, 2002, XP002280117, http://www.chemalliance.org/Columns/Regulatory/4-20-99.asp>.

"The Greenhouse Gas Protocol: A Corporate Accounting and Reporting Standard," World Resources Institute, 114 pp.

"Equipment Containing Ozone Depleting Substances at Industrial Bakeries," EPA, Federal Register, Feb. 2002: 67(25): 5586-5595.

European Search Report from European Patent Application No. 07252399.6, dated Sep. 20, 2007, 7 pp.

International Preliminary Examination Report of International application No. PCT/US2001/019491, completed Dec. 1, 2002, 9 pp.

International Search Report for published application No. WO2004053772 (PCT/US2003/039251), republished on Aug. 26, 2004, 3 pp.

International Preliminary Examination Report of international application No. PCT/US2003/039251, completed May 3, 2005, 9 pp.

Written Opinion of intenational application No. PCT/US2003/039251, mailed Sep. 15, 2004, 5 pp.

International Search Report, mailed Nov. 23, 2001, and Written Opinion, mailed Jun. 11, 2002, for international application No. PCT/US2001/019491, 9 pp.

International Search Report and Written Opinion for international application No. PCT/US2004/027165, filed Aug. 20, 2004, both mailed Feb. 21, 2005, 10 pp.

International Preliminary Examination Report for international application No. PCT/US2003/039517, filed Dec. 12, 2003, mailed Mar. 29, 2005, 7 pp.

International Search Report, mailed Nov. 4, 2004, and Written Opinion, mailed Oct. 15, 2004, for International application No. PCT/US2003/039517, 13 pp.

International Preliminary Examination Report (with written opinion) of international application No. PCT/US2004/027165, issued Feb. 21, 2006, 7 pp.

* cited by examiner

ENTERPRISE ENERGY MANAGEMENT SYSTEM

CROSS-REFERENCE TO RELATED APPLICATIONS

The present application is a Continuation-In-Part of U.S. patent application Ser. No. 10/768,957, filed Jan. 30, 2004 now U.S. Pat. No. 7,062,389, which claims the benefit of U.S. Provisional Patent Application No. 60/444,091, filed Jan. 31, 2003, and further is a Continuation-In-Part of U.S. patent application Ser. No. 09/883,779, filed Jun. 18, 2001, which claims the benefit of U.S. Provisional Patent Application No. 60/212,234, filed Jun. 16, 2000 and U.S. Provisional Patent Application No. 60/288,827, filed May 5, 2001, the contents of which are each incorporated herein by reference in their entirety. The present application is also a Continuation-In-Part of U.S. patent application Ser. No. 10/429,619, filed May 5, 2003, which claims the benefit of U.S. Provisional Application No. 60/432,120, filed Dec. 9, 2002, the contents of which are each incorporated herein by reference in their entirety. Further, the present application is a Continuation-In-Part of U.S. patent application Ser. No. 10/734,725, filed Dec. 12, 2003, which claims the benefit of U.S. Provisional Patent Application No. 60/433,179, filed Dec. 13, 2002, the contents of which are each incorporated herein by reference in their entirety. In addition, the present application is a Continuation-In-Part of U.S. patent application Ser. No. 10/771,090, filed Feb. 3, 2004, which claims the benefit of U.S. Provisional Patent Application No. 60/444,437, filed Feb. 3, 2003, the contents of which are each incorporated herein by reference in their entirety. The present application is also a Continuation-In-Part of U.S. patent application Ser. No. 10/922,364, filed Aug. 20, 2004, which claims the benefit of U.S. Provisional Patent Application No. 60/496,432, filed Aug. 20, 2003, the contents of which are each incorporated herein by reference in their entirety. The present application is also a Continuation-In-Part of U.S. patent application Ser. No. 11/431,147, filed May 9, 2006, the contents of which are incorporated herein by reference in their entirety.

BACKGROUND OF THE INVENTION

This invention relates generally to a system and method for managing energy consumption by equipment assets located at a site. More specifically, it relates to a system for tracking, evaluating, and responding to equipment energy consumption information at a site or a set of distributed sites.

Energy consumption is typically a significant and ever increasing operating expense faced by large sites or facilities, such as government, commercial retailers, and industrial facilities (collectively "sites"). Currently, facility managers lack a system or tool to track and manage energy consumption by equipment assets located at a site. Management of energy consumption is even more difficult for an enterprise including multiple facilities or sites distributed throughout a large geographic region. For example, a large retail chain having sites distributed at locations throughout the United States may have hundreds of locations each requiring independent monitoring and evaluation. Located within these hundreds of locations may be tens of thousands of pieces of energy consuming equipment, which contribute to the overall energy consumption profile of its site and of the retail chain enterprise. Each year, enterprises lose profits due to their inability to effectively track energy management.

Accordingly, there is a need in the art for a system or method for tracking or monitoring the use of energy consumption by equipment located at one or more sites. There is a further need for a system for evaluating equipment energy consumption and taking action to reduce an overall energy cost.

BRIEF SUMMARY OF THE INVENTION

The present invention, in one embodiment, is a system for managing energy consumption by equipment at a site. The system includes a database including a plurality of characteristics relating to a piece of energy consuming equipment located at the site. The system also includes a database including a plurality of service technicians. In addition, the system includes a database comprising billing information relating to the piece of energy consuming equipment. Further, the system includes a server including software for reconciling and paying a utility bill, based on the plurality of characteristics relating to the equipment and the billing information.

The present invention, in another embodiment, is a system for managing energy consumption by equipment at a plurality of sites. The system includes a database including a plurality of characteristics relating to a plurality of energy consuming equipment located at the plurality of sites and a data source comprising weather and temperature information for a region associated with at least one of the plurality of sites. In addition, the system includes a server including software for correlating certain of the plurality of characteristics relating to the plurality of energy consuming equipment with the weather and data information. In this invention, wherein a trend is predicted based on the correlating certain of the plurality of characteristics relating to the plurality of energy consuming equipment.

In another aspect, the present invention is a method of managing energy consumption by equipment located at a plurality of sites. The method includes collecting a set of information relating to a plurality of pieces of energy consuming equipment located at a plurality of sites and correlating certain of the information relating to the plurality of pieces of energy consuming equipment with weather and temperature information and market demand and utility rate information. Further, the method includes transmitting electronic operating instructions to at least one of the plurality of pieces of energy consuming equipment based on the correlating certain of the information relating to the plurality of pieces of energy consuming equipment, the weather and temperature information, and the market demand utility rate information.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
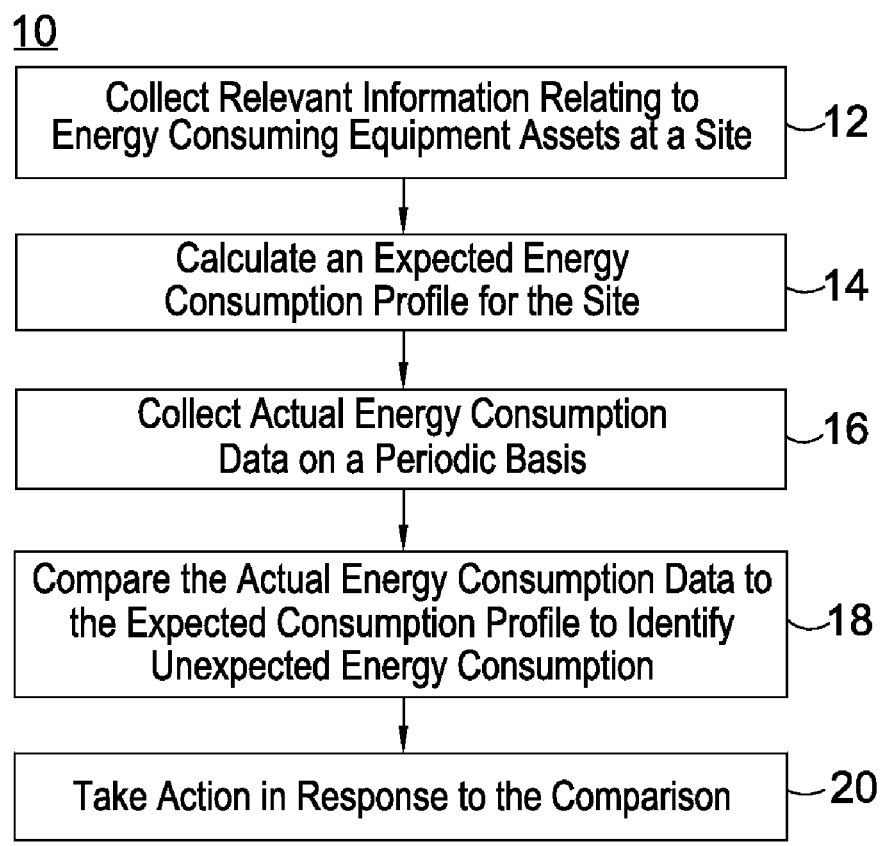
FIG. 1 is a flow chart a method for managing energy consumption at a site, according to one embodiment of the present invention.

FIG. 1 is a flow chart showing an energy management method 10, according to one embodiment of the present invention. As shown in FIG. 1, the energy management method 10 includes collecting relevant information relating to energy consuming equipment assets located at a site (block 12). Based on this information, an expected energy consumption profile is calculated for the site (block 14). Actual energy consumption data is then collected from the site on a periodic basis (block 16). The actual energy consumption data is then compared to the expected consumption profile (block 18). If the actual consumption data exceeds the expected consumption profile, action is taken to address the unexpected energy consumption (block 20). The collection process (block 12) is performed once for each piece of equipment and is distinct from the collection of actual energy consumption (block 16).

The equipment for which relevant information is collected (block 12) may include equipment consuming electrical energy, equipment combusting hydrocarbon energy sources (e.g., natural gas or propane), equipment consuming both, or any other energy-consuming or utility service-utilizing equipment as described herein, including equipment that consumes, utilizes, or is powered by electricity. In one embodiment, equipment using water is also included. Further, the equipment can also include any equipment that consumes or utilizes phone service, cable television service, high-speed internet service, or any other device that consumes, utilizes, or is powered by electronic or energy services.

Figure 2:
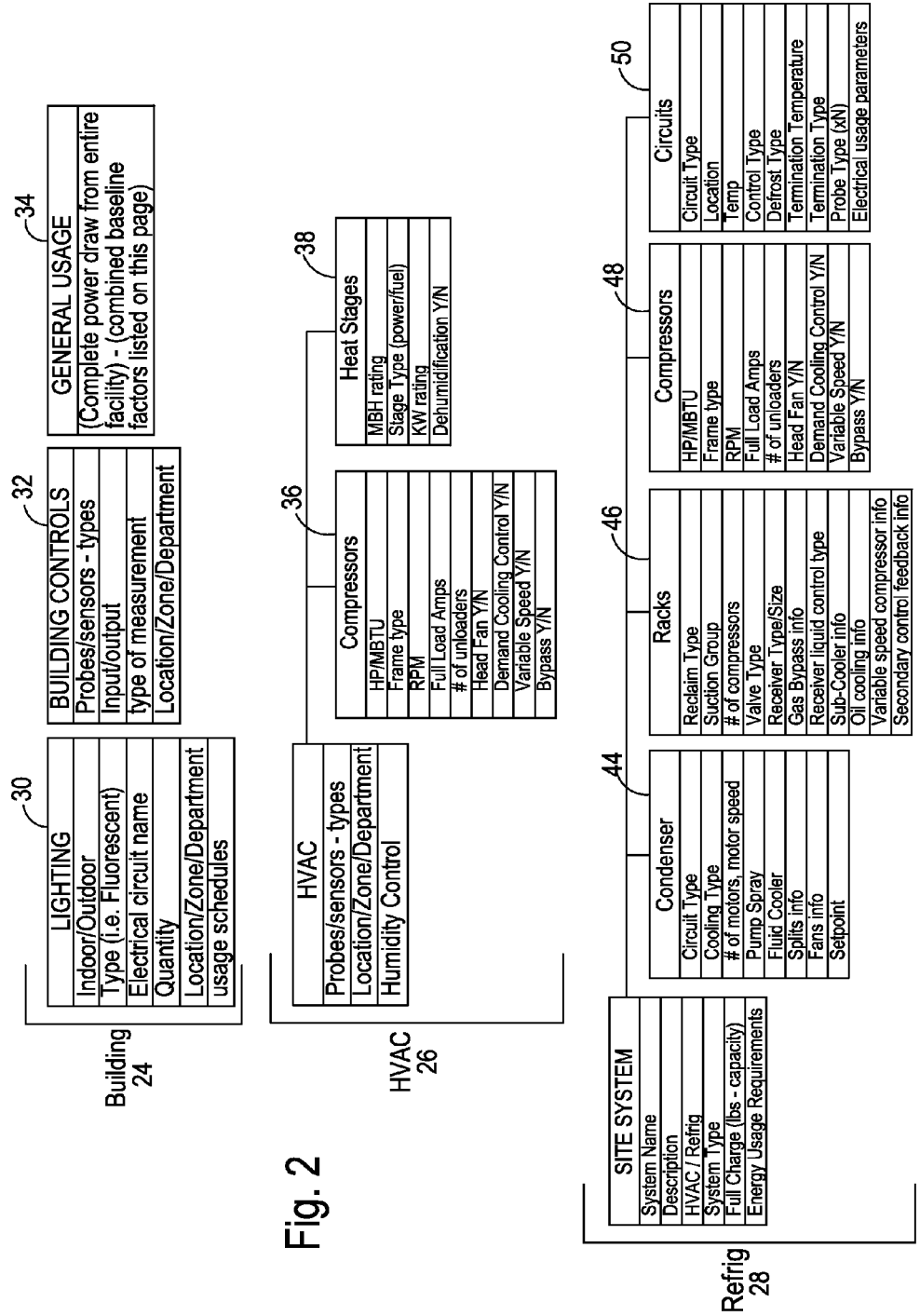
FIG. 2 is a diagram showing the various types of information, relating to energy consuming equipment assets, collected in one embodiment of the present invention.

The information collected for an energy consuming asset varies depending on the type or category of equipment. FIG. 2 is a diagram showing the information collected for various types of equipment, according to one exemplary embodiment of the invention. As shown in FIG. 2, the exemplary equipment may be placed into three categories, namely building 24, HVAC 26, and refrigeration 28. The embodiment of FIG. 2 further categorizes building 24 into lighting 30, building controls 32 and general usage 34. As shown, HVAC 26 is further categorized into compressors 36 and heat stages 38, and refrigeration 28 is further categorized into condensers 44, racks 46, compressors 48, and circuits 50. FIG. 2 further shows several example fields of information that may be collected for each type of equipment.

In one embodiment, the process of collecting information (block 12) is controlled such that each field has a set of acceptable attributes. This approach provides a uniform naming convention, such that the same piece of equipment receives the same name each time it is entered into the system.

Figure 3:
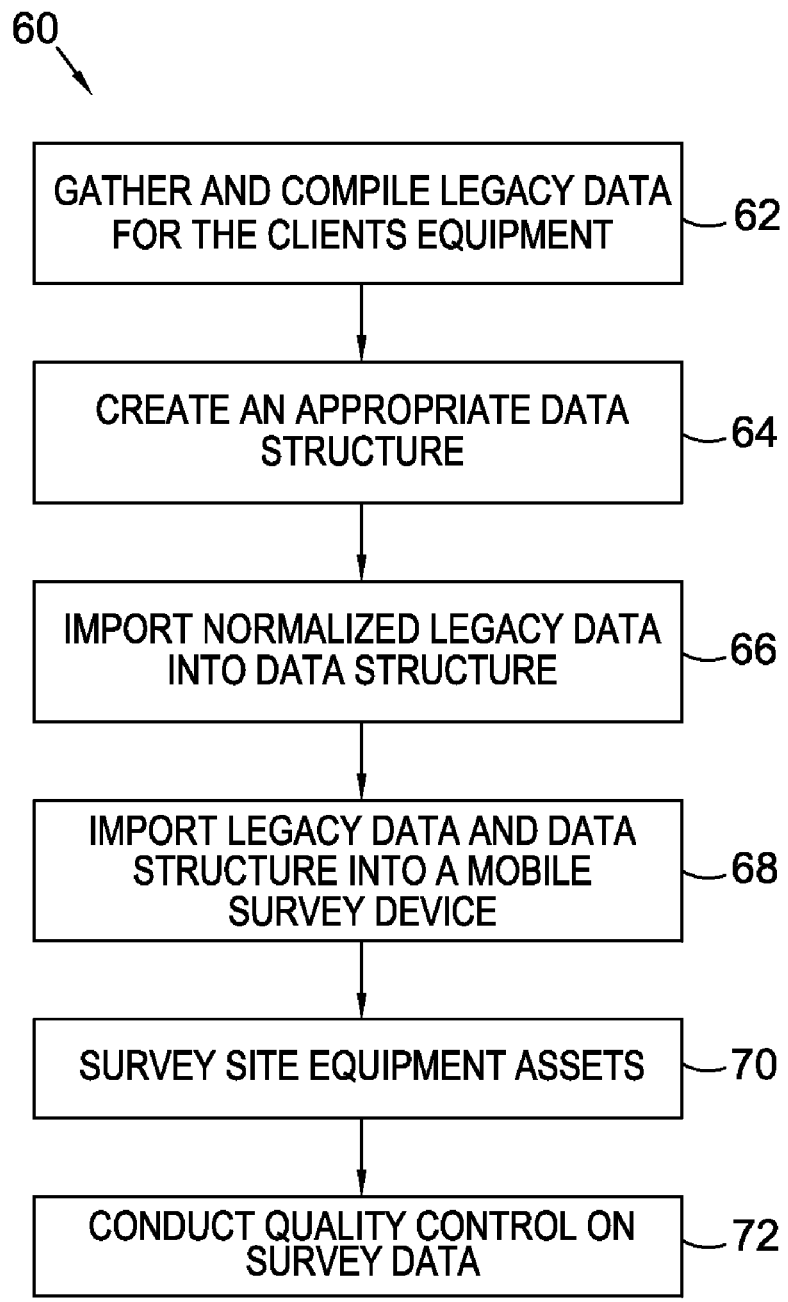
FIG. 3 is a flow chart showing an equipment surveying method, according to one embodiment of the present invention.

According to one embodiment, the process of collecting and storing information relating to energy consuming equipment or assets located at a site (block 12) is implemented using or in conjunction with a method or system for surveying equipment assets located at a site or at multiple distributed sites. One example of such a system is disclosed in co-pending U.S. patent application Ser. No. 10/771,090, entitled "Site Equipment Survey Tool," filed on Feb. 3, 2004, which is incorporated herein by reference in its entirety. FIG. 3 is a flow chart showing an equipment surveying method 60, according to one embodiment of the present invention. As shown in FIG. 3, the equipment surveying method 60 includes gathering and compiling legacy data for a client's equipment assets (block 62), creating an appropriate data structure for collecting and storing equipment information (block 64), importing normalized legacy data into the data structure (block 66), importing the data structure and the legacy data (block 68), and surveying site equipment assets to collect relevant information (block 70). In one embodiment, a quality control review is conducted on the collected survey data (block 72).

The information relating to energy-consuming equipment or assets, according to one embodiment, can be organized within the asset database 112 or retrieved from the database 112 according to asset, according to site, or any other desired parameter. That is, the information can be stored or retrieved on a per-site basis or a per-asset basis. For example, organizing information on a per-site basis allows for consideration of all energy management information at a site and processing of that information for purposes described herein. Alternatively, organizing the information on a per-asset basis is also useful as described herein.

Based on the information collected for the equipment located at the site and information known about the site itself, an expected energy consumption profile is calculated. Many techniques and algorithms for calculating expected consumption are known in the art and will function in combination with the present invention. In one embodiment, this expected consumption profile is then adjusted by considering known current operating conditions, weather, environmental conditions, and peak customer traffic. In one embodiment, the expected consumption profile further considers stored historical consumption data for a site, where such data is available.

Actual energy consumption for the site is then collected or monitored during operation. In one embodiment, energy consumption information is manually collected and recorded on a periodic basis. In another embodiment, energy consumption information is collected real-time or near-time using energy sensors or probes. These energy sensors, for example, may be TCP/IP network devices that only need to be connected to the sites communications network. This network could be a wired or wireless network. These network devices then take reading and post real-time energy consumption data to the network for use with the method 10.

The amount of data points collected may also vary significantly. In one embodiment, for example, the actual energy consumption data may include only one electrical meter reading or one gas meter reading (or both) for each broad equipment category. In another embodiment, the actual energy consumption data includes one electrical meter reading or one gas meter reading (or both) for each subcategory of equipment. In yet another embodiment, each piece of energy consuming equipment is monitored individually by a dedicated electric or gas consumption sensor. Any sensor or meter known to those skilled in the art may be used to monitor energy consumption.

Figure 4:
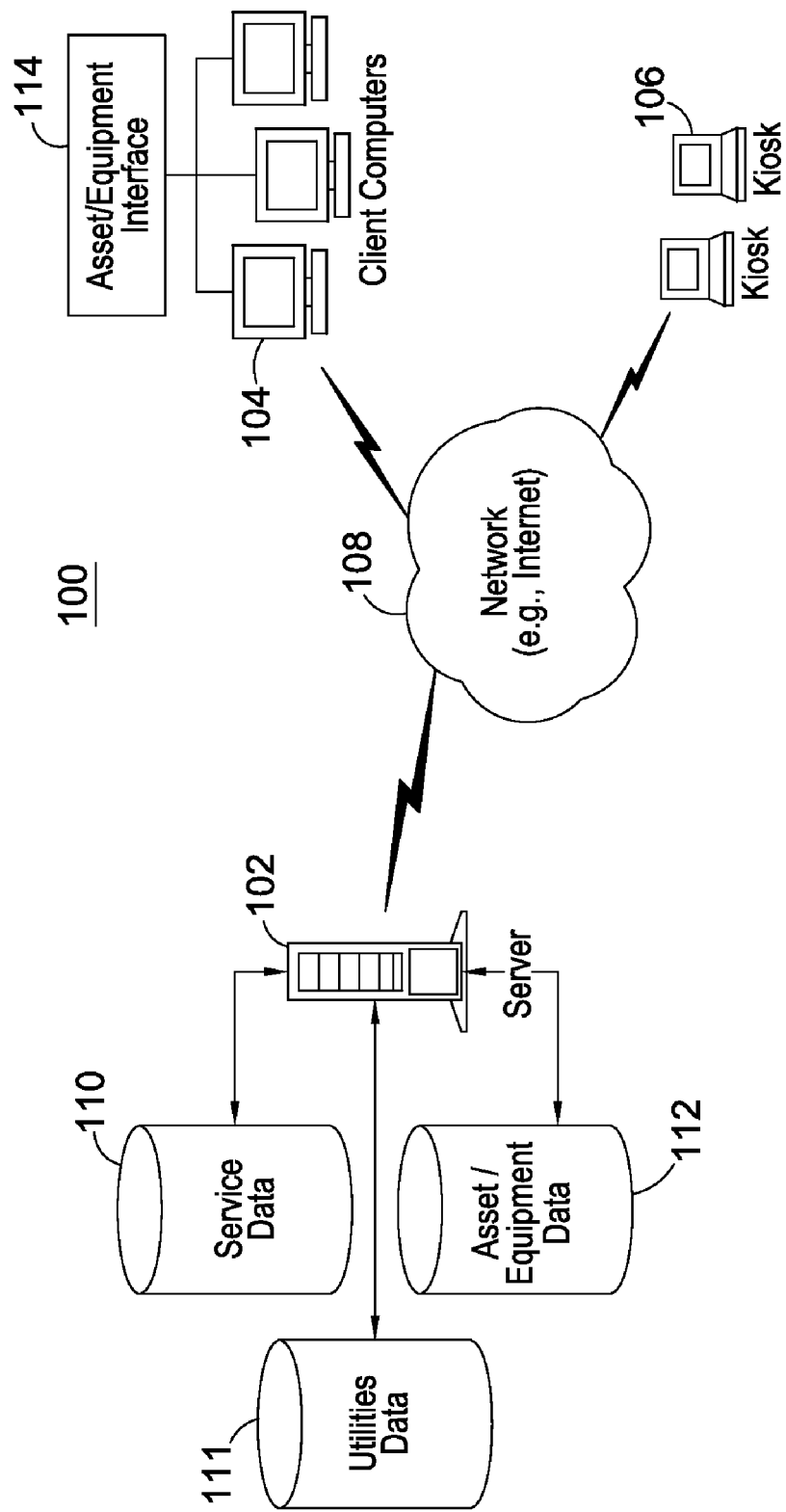
FIG. 4 is a schematic diagram showing an energy management system, according to a second embodiment of the present invention.

In one embodiment, the system of the present invention is implemented in conjunction with a enterprise asset management system for managing the assets of a distributed enterprise. One example of such a system is disclosed in co-pending U.S. patent application Ser. No. 09/883,779, entitled "Method and System for Managing Enterprise Assets," filed on Jun. 18, 2001, which is incorporated herein by reference in its entirety. FIG. 4 is a schematic diagram showing a network-based energy management system 100 according to a second embodiment of the present invention. As shown in FIG. 4 the system 100 includes a server 102 in communication with client computers 104 and kiosks 106 through a network 108. The client computers 104 and kiosks 106 are located at each of the various distributed sites. The system 100 allows a distributed enterprise to monitor and track energy consumption at multiple sites.

As further shown, in one embodiment, the server 102 is in communication with a service database 110, a utilities database 111, and an asset or equipment database 112. Alternatively, the service data, utilities data, and asset or equipment data are maintained in a single database. The client computers 104 are in communication with individual pieces of equipment through an asset/equipment interface 114. In one embodiment, this interface 114 is configured to accept input from the energy consumption sensors. In one embodiment, the interface 114 is a local area wired or wireless network. In one embodiment, the interface 114 includes software to translate and normalize signals received from various types of equipment, such as that disclosed in co-pending U.S. patent application Ser. No. 10/734,725, filed on Dec. 12, 2003, which is incorporated herein by reference in its entirety.

In one aspect of the invention, an interface 114 associated with a particular piece of equipment such as, for example, an HVAC system, allows for collection of information, including real-time information, directly from the piece of equipment. Further, the information collected from the asset or piece of equipment can then be used in the present system in any fashion taught herein. In one example, given that the method and system of service and maintenance described below provides for tracking and providing for all service and maintenance needs of any given asset, the HVAC system information collected by the appropriate interface 114 can then be compared to any known service or maintenance issues related to that HVAC system.

Figure 5:
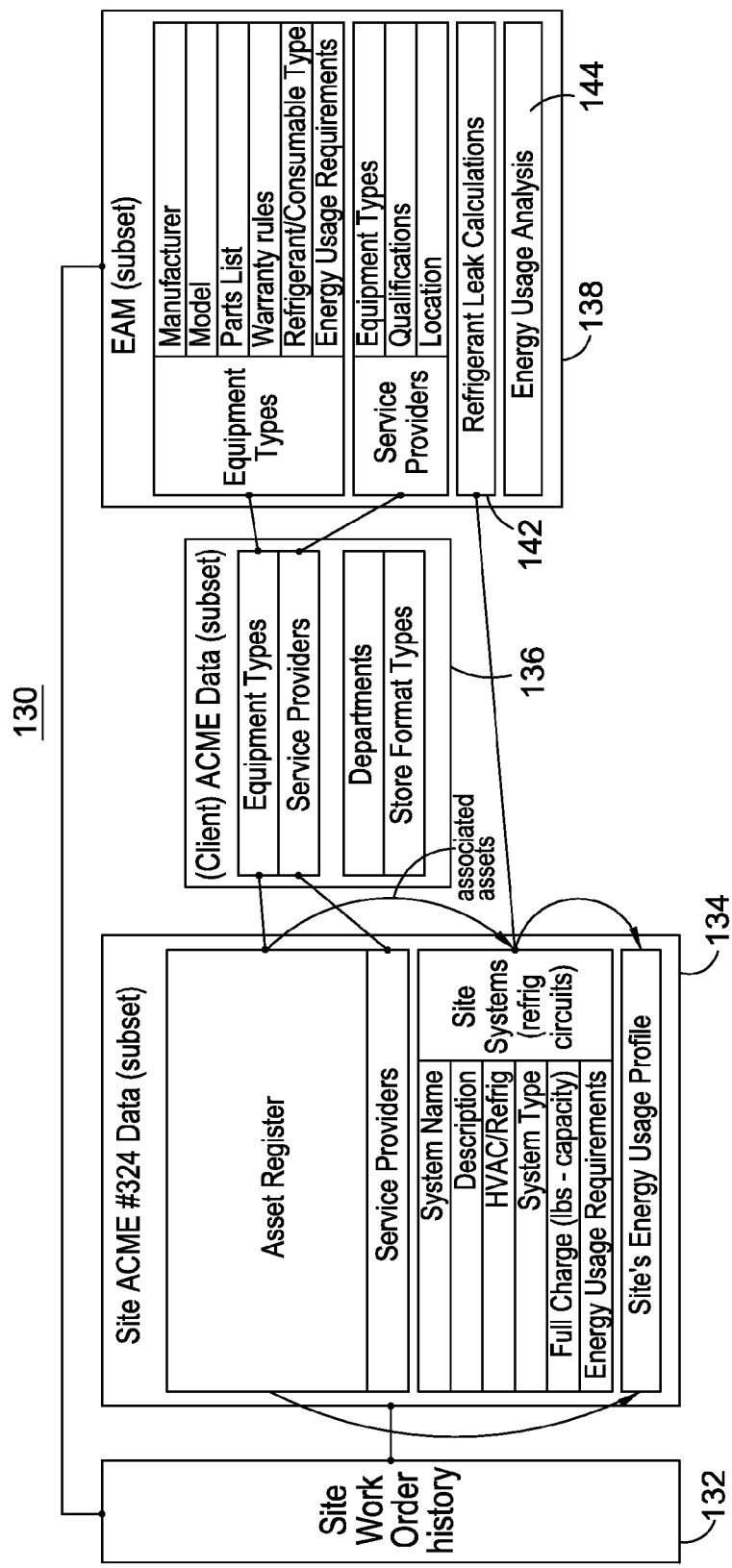
FIG. 5 is a diagram showing a structure for storing energy consumption data, according to one embodiment of the present invention.

In one embodiment of the present invention, the system 100 further tracks and manages refrigerant loss in the enterprises various refrigeration circuits, as disclosed in co-pending U.S. patent application Ser. No. 10/429,619, filed on May 5, 2003, which is incorporated herein by reference in its entirety. FIG. 5 is a diagram showing a database structure 130 for storing information relating to various categories of energy consuming and refrigerant using equipment. The database structure 130 is useful in correlating energy consumption data with refrigerant loss data to explain trends in energy consumption. As shown in FIG. 5, the database structure 130 includes work order data 132, site specific data 134, client or enterprise specific data 136, and general data 138. The structure 130 shown allows various equipment categories and attributes to be configured by the particular enterprise. The work order data 132 includes information relating to repairs of site refrigeration circuits, which are used to calculate refrigeration leaks (block 142).

The structure 130 allows a user to correlate changes in energy consumption (block 144) with refrigeration leaks. This allows a user or the system 100 to explain the reason for unexpected energy consumption or spikes during a particular time period. This could be accomplished, for example, by comparing energy consumption over a specified period of time with refrigerant loss and repair data for the same period of time. If a piece of equipment was operating with a low level of refrigerant, it may explain the spike in energy consumption for that period of time.

Using the information relating to the energy consuming equipment at a site and the actual energy consumption data collected, a user of the method 10 or the system 100 can compare consumption information to utility bills to identify potential billing errors. Likewise, a user can analyze consumption information and identify potential equipment malfunctions in need of repair.

In one embodiment, the utilities database 111 includes information about various utility providers that provide utilities to various sites of the enterprise. For example, the utility providers can include, but is not limited to, providers of electricity, gas, water, sewage systems, phone service, cable television service, high-speed internet service, and any other provider of electronic or energy services. In one embodiment, the database 111 further includes a roster of contacts for each utility provider, including, according to one embodiment, service technicians for each utility provider. In accordance with one aspect of the invention, the database 111 further includes for each utility provider a list of billing-related and service-related incentives, rebates, discounts, or any other form of money-saving package or offer offered to customers by the utility provider. For each money-saving package or offer, the specific condition(s) or event(s) that must be satisfied such that the package or offer can be redeemed or cashed in or otherwise obtained by a customer are also included in the database.

Figure 6:
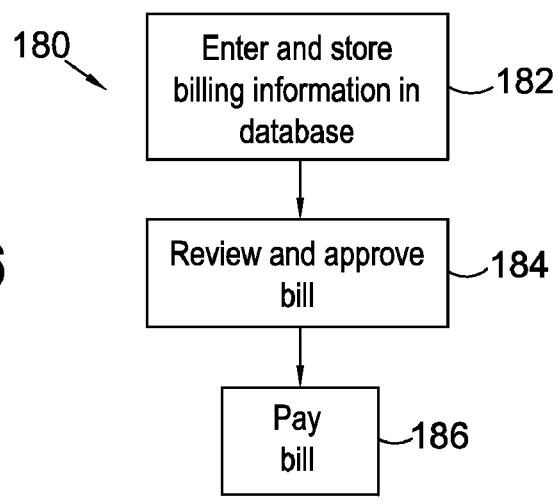
FIG. 6 is a flow chart showing a method of processing and paying utility bills, according to one embodiment of the present invention.

In use, according to one embodiment as shown in FIG. 6, the system 100 of the present invention provides for a method of processing utility bills 180 in the following manner. The system 100 allows for entry and storage in the database 111 of billing information at each site for each utility provider (block 182). The system 100 further provides for review and approval of each bill received from each utility provider at each site (block 184). In addition, the system 100 provides for payment of each bill from each utility provider (block 186).

The billing information for entry and storage (block 182) can include, but is not limited to, all the information provided in each periodic bill or invoice that is provided by a utility provider. For example, the billing information can be all invoice information provided separately by each of the gas provider, electricity provider, water provider, phone service provider, and sewage service provider for a site. In one embodiment, the billing information is entered manually by a user, such as an employee of the enterprise or an employee of the utility provider, at a client computer 104 or kiosk 106 or other entry point. Alternatively, the information is entered electronically. For example, electronic entry can be accomplished by scanning a document with any known scanner utilizing OCR or any other scanning technology and loading the scanned information into the system. In another example, the information is entered electronically by direct electronic communication between the billing system of the utility provider and the system 100 of the present invention over the network 108. In a further alternative, the billing information is electronically compiled by an external individual or individuals, such as, for example, a third-party entity hired to compile the billing information into a format that can be easily loaded into the present system 100, and then the billing information is loaded into the system 100. According to one embodiment, the third-party individual or individuals compile historical billing information into an appropriate format for loading into the system 100. Alternatively, the third-party individual or individuals compile current billing information on an on-going basis for loading into the system 100. In a further alternative, both historical and current billing information are compiled into an appropriate format by the third party individual or individuals.

The bill review and approval process (block 184) can, in one aspect of the invention, include distributing a hardcopy or an electronic copy (via e-mail, for example) of the bill to each appropriate individual. The individual can then review the bill and contact the appropriate individual regarding whether the bill is approved or disapproved (and provide reasons for disapproval). The approval or disapproval information can be provided verbally or electronically (via e-mail, for example). Alternatively, the bill review and approval process (block 184) includes making the bill available to each appropriate individual via a client computer or kiosk so that the individual can access and review the bill and then indicate at the computer or kiosk either approval or disapproval of the accuracy of the bill. According to one embodiment, if the individual does not approve of any portion of the bill for any reason, the individual can input into the system a description of the disapproval and the reasons for the disapproval. In one aspect of the invention, the system forwards the description to an appropriate individual to prompt corrective measures.

According to another aspect of the invention, the bill review and approval process (block 184) further includes identification of relevant money-saving packages or offers related to the bill under review. For example, the server 102 may access the database 111 to identify any money-saving packages or offers from the utility provider that sent the bill under review. The server 102 may then compare the package or offer to the current bill to determine whether the bill qualifies for the discount, rebate, or other money-saving offer. Alternatively, the server 102 identifies the relevant money-saving package or offer and transmits it to a user so that the user can determine whether the bill qualifies for the package or offer. If the bill qualifies, the package or offer is automatically applied to the bill total, thereby reducing the amount owed. Alternatively, a user applies the offer or package to the bill.

According to one embodiment, the payment of a bill (block 186) can include payment of more than one bill for more than one site from the same provider. That is, the system 100 can consolidate more than one bill from the same utility provider and provide for payment of the aggregate amount. For example, perhaps an enterprise has six sites, each provided with gas by the same gas provider. Thus, each site receives a bill from the gas provider. The system 100 of the present invention, according to one embodiment, allows for entry of each bill into the system, either manually or electronically as described above. The system 100 then combines the amount owed for each site to arrive at a total amount. The system 100 then allows for payment to the provider of the consolidated amount.

Figure 7:
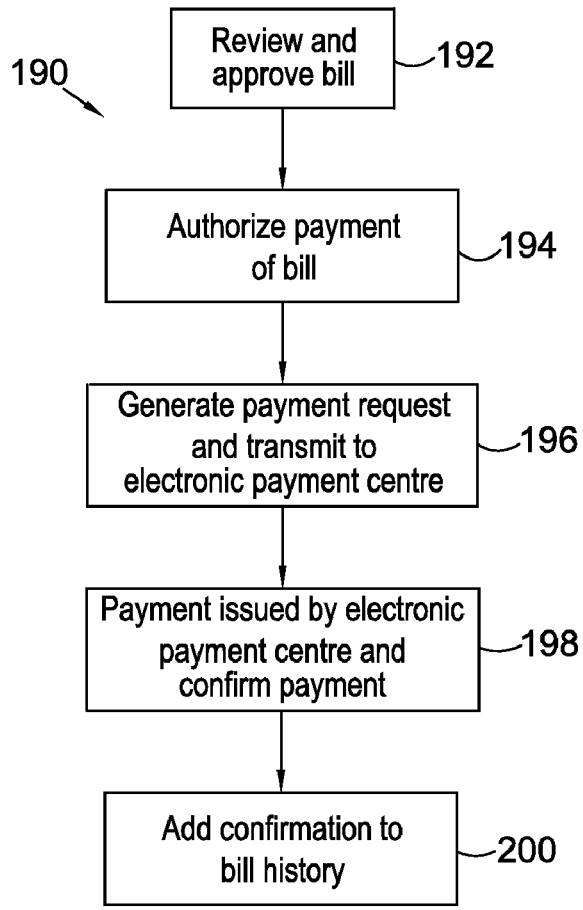
FIG. 7 is a flow chart showing an electronic payment method, according to one embodiment of the present invention.

Payment to the provider can be accomplished using an electronic payment system, according to one embodiment. One example of an electronic payment system that can be utilized in conjunction with the present invention is provided in U.S. application Ser. No. 10/922,364, entitled "Electronic Payment System," filed on Aug. 20, 2004, which is incorporated herein by reference in its entirety. FIG. 7 is a flow chart showing an electronic payment method 190 according to one embodiment of the present invention. As shown in FIG. 7, the method 190 includes review and approval of the utility bill (block 192). The business enterprise then electronically authorizes payment of the bill (block 194). Alternatively, the electronic authorization step is not required. An electronic payment request is then generated and transmitted to an electronic payment center (block 196). The electronic payment center issues payment to the utility provider and provides confirmation of the payment (block 198). Finally, the payment confirmation is added to the history of the corresponding bill (block 200). FIG. 2 is a flow chart showing an electronic payment method 30 according to one embodiment of the present invention. As shown in FIG 2, the method 30 includes a service provider electronically confirming completion of repair or maintenance activity pursuant to a work order issued by a client or business enterprise (block 32). The business enterprise then electronically authorizes payment for completion of the work order (block 34). An electronic payment request is then generated and transmitted to an electronic payment center (block 36). The electronic payment center issues payment to the service provider and provides confirmation of the payment (block 38). Finally, the payment confirmation is added to the history of the corresponding work order (block 40).

In one embodiment, the database 110 includes information about various service providers, including a list of service providers certified to perform maintenance on equipment, including appropriate utility providers. In one embodiment, the database 110 further includes a roster of technicians for each service provider or utility provider. In one embodiment, a work order is automatically generated and dispatched, by the system 100, requesting repair of the equipment. In this embodiment, a work order is generated in response to detection of unexpected energy consumption. This detection may occur by analyzing historic data for some period of time or by monitoring real-time data obtained from network-ready sensors. Depending upon the level of specificity of the energy consumption monitoring meters and sensors, the system 100 can provide various amounts of specificity and the repair required. In a further embodiment, in order to track repair and maintenance costs and to monitor the servicing of equipment, a system and method is provided for managing the servicing and maintenance of asset by third-party service providers or in-house personnel. The method generally comprises generating a service request or work order from a client computer, receiving a service request or work order at the central processor through the web site, determining a service provider, automatically transmitting to the service provider the service request and any additional asset information which may be needed by the service provider, and awaiting a response to the service request. According to one implementation, if no response is received within a predetermined period of time, the electronic message is resent. In one embodiment, an identification of authorized service personnel is maintained in a database and linked to particular assets. Once a service requests is processed by the central processor 11, a service provider is determined automatically by determining which service provider is linked to the particular asset and a particular geographic location, and the service provider is notified automatically via an E-mail within a specified period of time, additional E-mails may be sent automatically. The E-mail can include the type of asset requiring service, the reported failure, location, contact person, and prior service history of the asset. In addition, the service provider may also obtain additional information on the asset by accessing the central processor 11 via the internet or a kiosk 15.

For example, if monitoring is performed on each individual piece of energy consuming equipment, the system 100 can identify the particular piece of equipment that has malfunctioned and can provide that information to the service technician. Furthermore, the system 100 can extract known information relating to the equipment requiring service from the equipment database 112 and provide all relevant information to the service provider. This information allows the service provider to bring all tools and repair parts that may be necessary to complete the repair and further allows the service technician to accomplish the repair more quickly and cost effectively. In one embodiment, the service provider completes the work order using the kiosk 106 located at the site.

Figure 8:
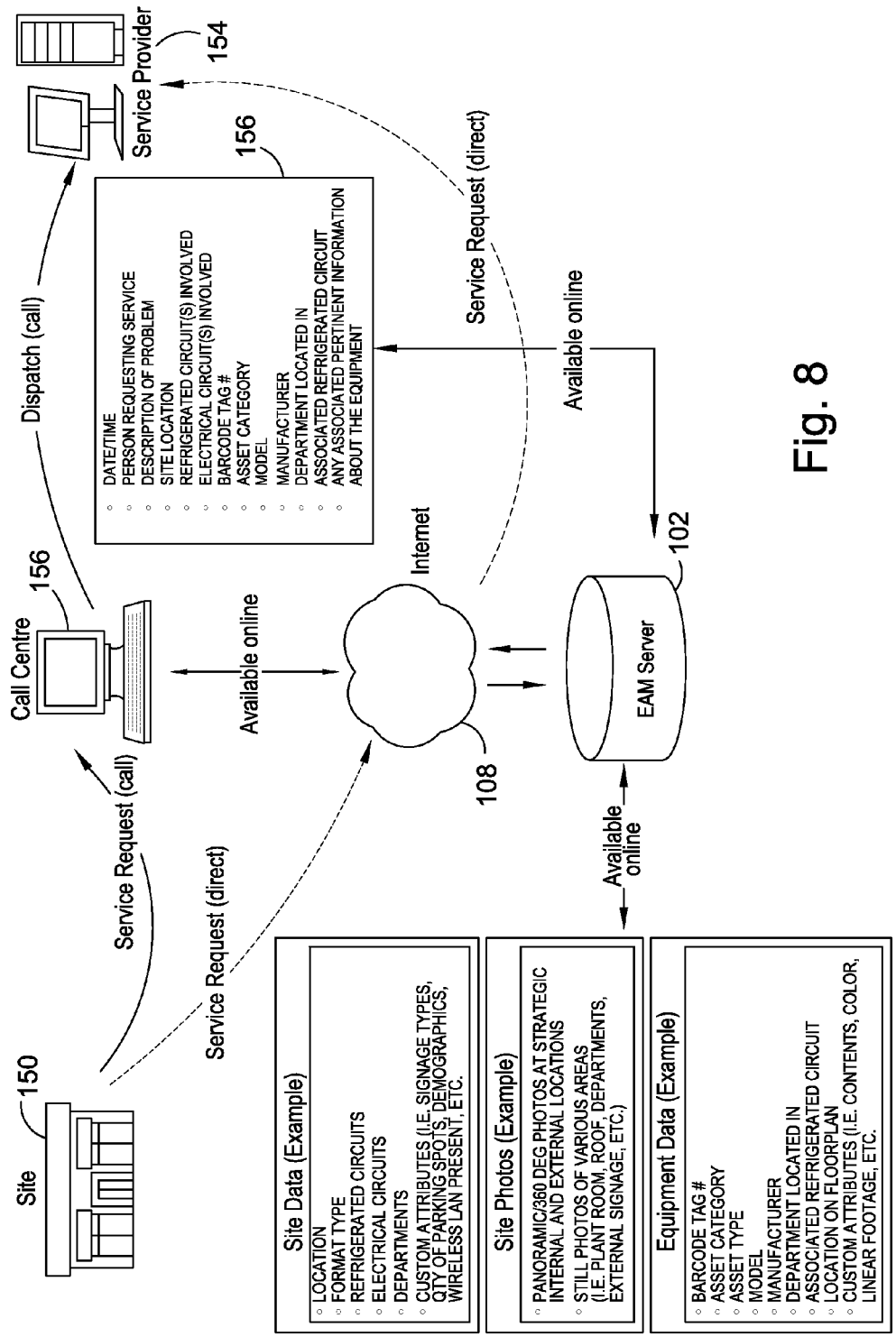
FIG. 8 is a diagram showing a process for using the energy management system to facilitate dispatch of a service provider, according to one embodiment of the present invention.

FIG. 8 is a diagram showing the use of the system 100 to facilitate dispatch of a service provider. As shown in FIG. 8, the service request is initiated at a site 150. The service request is communicated to the server 102 through the communication network 108. The server 102 forwards the service request to an appropriate service provider 154. The initial service request may be generated from the site 150 in several different ways. In one embodiment, a person at the site 150 contacts a call center 156, which connects to the server 102 and creates an electronic service request. In another embodiment, an authorized user at the site 150 connects to the server 102 using the communication network 108 and directly places the service request. In another embodiment, the server 102 is receiving signals from various pieces of equipment, as described in further detail above, and based on these signal the server 102 detects a malfunction and automatically generates a service request. The service request may be initiated using the unique code assigned the piece of malfunctioning equipment.

Once a service request is communicated from the site 150 to the server 102, the server 102 compiles a package of useful information known about the equipment for which service is requested, from the system database. For example, in one embodiment, the information displayed in block 156 of FIG. 8 is compiled and communicated to the service provider 154. In other embodiments, more or less information is communicated. As described above, this information may facilitate the service process by providing important information relating to the equipment. In one embodiment, the information further includes a floor plan for the site 150 including a designation of the location of the malfunctioning equipment or a picture of the equipment (or both).

In another embodiment, the method 10 and the system 100 are used to calculate a total cost of ownership of an asset. Currently, retail enterprises generally make equipment purchasing decisions based on the purchase cost of the equipment and a general reliability rating. Retail enterprises lack an effective system for factoring energy consumption in the analysis of a total cost of the equipment. The system 100 tracks and archives energy consumption by energy consuming equipment or groups of equipment in the database 110 or 112. In this embodiment, the server 102 is programmed to calculate a total cost of ownership of a piece of equipment using at least the purchase cost of the equipment, the repair costs associated with the equipment, and the energy consumption cost of the equipment.

The system 100 of the present invention further provides for data analysis, including data correlation and predictive analysis. That is, according to one embodiment, the system 100 includes software that can utilize the information stored, assimilated, or used by the system to identify correlations with other information and utilize those correlations to predict trends. Subsequently, the enterprise or a user can take appropriate actions based on a predicted trend.

The information that can be used for the correlation analysis includes the energy management information, the refrigeration loss information, the utility bill information, the service and maintenance information, the total cost information, present and historical weather and temperature data for a relevant region, market demand for a utility service, and the current rate (cost per unit) for a utility service. In one aspect of the invention, the present and historical weather and temperature data, the market demand for a utility service, the current rate for a utility service, and any other similar or related data can be included in a database or separate databases in the present system 100 or it can be accessed by the system from another source such as an external database accessed over the network, a diskette, a compact disk, or any other data source. According to one embodiment, utility billing information is correlated with service and maintenance information, refrigerant usage, energy usage, total cost information, weather/temperature information, utility service market demand, and a current utility service rate or rates. That is, certain events, details, or trends in the billing information are correlated with any other information. Alternatively, any of the above information can be correlated with any other of the above information. According to one embodiment, this allows a user or the system to relate changes in one set of parameters such as billing information to other parameters as described above. Thus, relationships between various types of information can be identified.

In accordance with another embodiment, the system 100 also provides for predictive analysis and preventative planning based on the correlated data described above. That is, the system 100 includes software that draws upon the data correlations identified above to predict future trends in the data. The enterprise or a user can then utilize a predicted trend and the above information to take appropriate steps to address any predicted impact of the trend. According to one exemplary embodiment, predicted weather patterns can be used to predict a trend in energy use and utility bill amounts. For example, perhaps a particularly cold winter has been predicted. The system 100 of the present invention can compare the predicted winter season with past correlations and/or calculated correlations between utility bills and similar winter seasons. Based on the correlations, the system can predict the impact of the cold winter season on the size of the utility bills for a site or a group of sites in the region impacted by the cold weather.

In another exemplary embodiment in which each site has been mapped with GIS capabilities as disclosed in U.S. application Ser. No. 10/771,090, which is incorporated herein by reference in its entirety, the system can compare a predicted storm path with site locations using a map-based interface and identify the sites of the enterprise predicted to be directly affected by possible utility outages. The system 100 can further notify a user or users of the predicted possible outages.

In another exemplary embodiment, a predicted temperature spike across a certain region can be used to predict expected energy requirements relating to electricity, etc. (and the resulting expected utility bills).

In any of the above three examples, additional factors could be considered relating to the predicted weather or temperature event, such as, for example, the current market demand and utility rates in each example. Thus, in this example, demand and rate trends could also be taken into account in formulating predictions regarding expected market demand and expected rates during weather- or seasonally-related events or periods.

Preventative action can then be taken by the user or the enterprise based on the predicted information provided by the system. In one embodiment, the user takes action based on the predicted information provided by the system 100. In the example of the predicted winter season, the user can take such steps as installing or providing additional heaters at the appropriate locations, reducing energy consumption at unaffected sites in anticipation of increased consumption at the affected sites, or any other appropriate action to prepare for the expected increase in utility consumption. In the example of the predicted storm path, the user could strategically position power generators or other services at the most vulnerable sites prior to the weather pattern. In the example of the predicted temperature spike, the user could place power generators at each site that is expected to be affected by the temperature spike to reduce the load on the electrical power grid in the area and reduce the utility bill for those sites.

Alternatively, the preventative action is implemented by the system 100. That is, the system 100 of the present invention allows for data and predictive analysis, including predicting certain trends relating to certain assets or equipment, and upon the triggering of a certain event associated with those predictions, electronically communicating or transmitting operating instructions to the relevant piece of equipment via the asset/equipment interface 114 associated with that piece of equipment. Thus, the asset/equipment interface 114 capabilities can be used in conjunction with the data and predictive analysis capabilities as described above to provide for preventative action or action to address the impact of a predicted trend.

In one embodiment, the asset/equipment interface 114 capabilities can be utilized in the present invention to remotely control operating parameters of certain energy or energy-related systems at a site, as disclosed in further detail in U.S. application Ser. No. 10/734,725, which is incorporated herein by reference in its entirety, to accomplish measures intended to prevent or reduce any negative impact of predicted phenomenon as described above. Thus, the system 100 of the present invention allows for tracking various parameters relating to equipment at a site or multiple sites, performing data and predictive analysis, and upon the triggering of a certain event or predicted event associated with those parameters, electronically communicating or transmitting operating instructions to the equipment. According to one embodiment, the types of equipment that can be remotely controlled in this fashion include, but are not limited to, refrigeration, lighting, and HVAC equipment and systems.

In the example of the predicted cold winter season, the predicted cold temperatures can trigger the system to electronically communicate instructions to the HVAC systems and, in some embodiments, additional power consuming systems of unaffected sites to reduce power output of those systems, thereby reducing the heating bills at those sites and saving the enterprise money to compensate for the increased costs at the affected sites. In the example of the predicted temperature spike, the predicted high temperatures could trigger the system to electronically communicate instructions to the HVAC systems of unaffected sites to reduce power output of those systems, thereby reducing the air conditioning bills at those sites and saving the enterprise money to compensate for the increased costs at the affected sites.

In either of the above examples, the instructions transmitted by the system 100 can be further impacted by the system's consideration and analysis of the market demand information and utility rate information in addition to the predicted weather trends. According to one embodiment, the system 100 of the present invention, the predicted weather pattern results in a predicted demand and/or utility rate that triggers instructions transmitted by the system 100 to the relevant equipment through the appropriate interface 114 or interfaces 114 based on the predicted rate. Alternatively, a utility provider can provide real-time or nearly real-time demand and rate information that can be inputted into the system 100 of the present invention and based on the demand or rate, the system 100 can be triggered to transmit various instructions from the system 100 to the relevant equipment through the appropriate interface 114 or interfaces 114. For example, in the cold temperature example above, the server 102 software may predict a certain utility rate that triggers an electronic instruction to be transmitted to the equipment at the affected site or sites instructing the HVAC systems to reduce output by some predetermined percentage during the predicted peak rate period(s) to reduce expenses. Thus, the market demand and utility rate information can be taken into account in providing instructions to the relevant equipment and/or sites. In a further alternative, the system can be triggered by any number of different parameters to communicate with various equipment to implement preventative or remedial actions in response to a predicted trend.

Although the present invention has been described with reference to preferred embodiments, persons skilled in the art will recognize that changes may be made in form and detail without departing from the spirit and scope of the invention.

What is claimed is:

1. A system for managing energy consumption by equipment at a site, the system comprising:
    a first database including a plurality of characteristics relating to a piece of energy consuming equipment located at the site;
    a second database including information relating to a plurality of service technicians, the information comprising a list of the service technicians from at least one service provider;
    a third database comprising billing information relating to the piece of energy consuming equipment, wherein the billing information is based on periodic invoices received from a utility provider; and
    a server including software for reconciling and paying a utility bill, based on the plurality of characteristics relating to the equipment and the billing information.

2. The system of claim 1, wherein the server further comprises software for identifying any money-saving offer or package associated with the utility bill.

3. The system of claim 2, wherein the server further comprises software for applying the money-saving offer or package to the utility bill, whereby an amount of the utility bill is reduced.

4. The system of claim 1, wherein the service technicians are third party service technicians.

5. The system of claim 1, wherein the server further comprises software for identifying an appropriate one of the service technicians from the list and transmitting a service request to the appropriate one of the service technicians.

6. The system of claim 5, wherein the identifying the appropriate one of the service technicians comprises determining which service technician is linked to a piece of equipment requiring service.

7. The system of claim 5, wherein the service request comprises information regarding the piece of equipment requiring service.

8. The system of claim 7, wherein the information regarding the piece of equipment requiring service is chosen from the group consisting of date and time, site location of the piece of equipment, person requesting service, description of problem, equipment category, equipment type, model, manufacturer, and a picture of the piece of equipment.

9. The system of claim 1, wherein reconciling the utility bill comprises reviewing the bill and approving or disapproving the bill.

10. The system of claim 9, wherein the reviewing the bill comprises comparing the billing information to the plurality of characteristics relating to the equipment, wherein the plurality of characteristics comprises actual collected energy consumption information.

11. The method of claim 9, further comprising:
identifying an appropriate service technician from a list of service technicians; and
transmitting the service request to the appropriate service technician.

12. The system of claim 1, wherein paying the utility bill comprises consolidating more than one bill from more than one site and paying the consolidated bill.

13. The system of claim 1, wherein paying the utility bill comprises generating an electronic payment request and transmitting the electronic payment request to an electronic payment center.

14. The system of claim 1, wherein the server further comprises software for paying a service bill received from a service provider.

15. A system for managing energy consumption by equipment at a plurality of sites, the system comprising:
a first database including a plurality of characteristics relating to a plurality of energy consuming equipment located at the plurality of sites;
a data source comprising weather and temperature information for a region associated with at least one of the plurality of sites; and
a server including software for correlating certain of the plurality of characteristics relating to the plurality of energy consuming equipment with the weather and temperature information,
wherein the software predicts a trend based on the correlating certain of the plurality of characteristics relating to the plurality of energy consuming equipment.

16. The system of claim 15 wherein the server is triggered by the trend to communicate operating instructions to at least one of the plurality of energy consuming equipment.

17. A method of managing energy consumption by equipment located at a plurality of sites, the method comprising:
collecting a set of information relating to a plurality of pieces of energy consuming equipment located at a plurality of sites;
correlating certain of the information relating to the plurality of pieces of energy consuming equipment with weather and temperature information and market demand and utility rate information; and
transmitting electronic operating instructions to a least one of the plurality of pieces of energy consuming equipment based on the correlating certain of the information relating to the plurality of pieces of energy consuming equipment, the weather and temperature information, and the market demand utility rate information.

18. The method of claim 17, further comprising:
detecting unexpected energy consumption by one of the plurality of pieces of energy consuming equipment; and
generating a service request in response to the detecting the unexpected energy consumption.

19. The method of claim 17, wherein the collecting the set of information comprises collecting billing information relating to the plurality of pieces of energy consuming equipment, wherein the billing information is based on at least one periodic invoice received from at least one utility provider.

20. The method of claim 17, further comprising reconciling and paying a utility bill, based on the set of information relating to the plurality of pieces of energy consuming equipment located at at least one of the plurality of sites.

21. The method of claim 20, wherein reconciling the utility bill comprises reviewing the bill and approving or disapproving the bill.

22. The method of claim 21, wherein the reviewing the bill comprises comparing the billing information to the plurality of characteristics relating to the equipment, wherein the plurality of characteristics comprises actual collected energy consumption information.

23. The method of claim 20, wherein paying the utility bill comprises consolidating more than one bill from more than one site and paying the consolidated bill.

24. The method of claim 20, wherein paying the utility bill comprises generating an electronic payment request and transmitting the electronic payment request to an electronic payment center.

25. The method of claim 17, further comprising paying a service bill received from a service provider.

26. The method of claim 20, further comprising identifying any money-saving offer or package associated with the utility bill.

27. The method of claim 26, further comprising applying the money-saving offer or package to the utility bill, whereby an amount of the utility bill is reduced.

* * * * *